United States Patent [19]

Boussely et al.

[11] 4,180,492

[45] Dec. 25, 1979

[54] THIODIGLYCOL DIBEHENATE AND METHOD OF USE

[75] Inventors: Jean Boussely, Paris; Marie-Madeleine Chandavoine; Michel Chignac, both of Sisteron; Claude Grain, Volonne; Charles Pigerol, Saint-Ouen, all of France

[73] Assignee: Fevrier-Decoisy-Champion, Paris, France

[21] Appl. No.: 918,849

[22] Filed: Jun. 26, 1978

Related U.S. Application Data

[63] Continuation of Ser. No. 829,866, Sep. 1, 1977, abandoned, which is a continuation of Ser. No. 683,416, May 5, 1976, abandoned.

[30] Foreign Application Priority Data

May 7, 1975 [FR] France .............................. 75 14358

[51] Int. Cl.$^2$ ................................................ C08K 5/37
[52] U.S. Cl. ............................... 260/30.8 R; 260/399
[58] Field of Search ..................... 260/30.8 R, 399

[56] References Cited

U.S. PATENT DOCUMENTS

| 1,422,869 | 7/1922 | Kränzlein ................. 260/30.8 R |
| 2,356,586 | 8/1944 | Hentrich et al. ............... 260/36 |
| 2,454,568 | 11/1948 | Pollack .......................... 260/399 |

*Primary Examiner*—Stanford M. Levin
*Attorney, Agent, or Firm*—Mason, Kolehmainen, Rathburn & Wyss

[57] ABSTRACT

This application relates to a new polyester of behenic acid and thiodiglycol, namely thiodiglycol dibehenate.

The compound of the invention has been found to possess valuable properties as a lubricating agent for thermoplastic materials.

This application relates also to a method of use of said compound as lubricating agent for thermoplastic materials.

2 Claims, No Drawings

THIODIGLYCOL DIBEHENATE AND METHOD OF USE

CROSS REFERENCE TO RELATED APPLICATIONS

This application is a continuation of our copending application Ser. No. 829,866 filed Sept. 1, 1977, now abandoned, which is a continuation of copending application Ser. No. 683,416 filed May 5, 1976, now abandoned.

The present invention relates to a new polyester of behenic acid and thiodiglycol, namely thiodiglycol dibehenate.

Thiodiglycol dibehenate may be prepared, in accordance with known procedures, by reacting behenic acid with thiodiglycol in the presence of sodium or potassium hydroxide as catalyst and by eliminating the water which forms during the reaction.

It has been observed that thiodiglycol dibehenate possesses valuable properties as a lubricating agent for thermoplastic materials.

Thermoplastic materials are known to stick to the surfaces of the means in which they are formed and it is consequently necessary to add a lubricating agent to the masses of synthetic material in order to delay sticking as long as possible.

Numerous lubricating agents for thermoplastic materials are already known and they generally fall into one of the following two main classes:

(a) External lubricating agents, which aim at reducing interfacial friction and are employed in the proportion of 0.2 to 0.5% by weight. Amongst these agents, glyceryl trimontanate, which is described in British Pat. No. 1,314,269 and U.S. Pat. No. 3,691,219, is one of the most commonly employed on the industrial scale.

(b) Internal lubricating agents, which aim at diminishing the viscosity of the polymer when in the molten state and reducing the shearing forces. They are employed in the proportion of 0.1% to 1% by weight. Amongst these agents, glyceryl trihydroxystearate, which is described by R. LEFAUX in "Les matières Plastiques dans l'Industrie Alimentaire" (Compagnie Française d'Editions, 1972), is one of the most widely used in industry.

Mixed esters of aliphatic polyalcohols and higher aliphatic mono- and dicarboxylic acids, such as described in French Pat. No. 2,032,841, are known but are not deemed to be of value, for they provoke, when employed for lubricating polyvinyl chloride, a drop in the softening-point of the resin. Moreover, some of them cause increased sticking of the resin.

Thiodiglycol dibehenate has been found to be superior to the previously known lubricating agents with respect to one or more of the characteristics generally attributed to such agents. For instance, it increases the quality of the synthetic material, by improving both internal and external lubrication.

Furthermore, the compound of the invention has a low degree of toxicity and, when incorporated in a resin which is to be used for manufacturing containers, it has high resistance to extraction from the resin into the contents of the container. These findings are important because they are closely related to the problem of providing containers for food and drink and the possible pollution of the latter by the lubricated polymer from which the container is made.

Finally, the compound of the invention is not volatile and is stable under the influence of heat and air, even at high temperatures, which is very important with regard to the problems of manipulation and pollution in the workshops where the various operations are carried out.

Since, the compound of the invention may be incorporated into synthetic resins which are to be used for the manufacture of containers for food and drink, its toxicity was studied first and the satisfactory result obtained were such as to justify continuation of the investigation.

A. Acute toxicity

The acute toxicity of the compound of the invention was studied by attempting to determine the dose of substance which would provoke the death of 50% of the animals treated (LD50).

A gummy suspension of the compound was administered by oral route to groups of at least ten mice and it was found that even at doses exceeding 5000 mg/kg there were no toxic effects. Thus it may be concluded that the compound of the invention is for all practical purposes non-toxic.

B. Internal lubricating power

The compound of the invention was compared to glyceryl trihydroxystearate which may be considered as the best internal lubricating agent known up to present. This study was performed with the following formula, glyceryl trimontanate being used as external lubricating agent:

| Ingredients | Parts by weight |
|---|---|
| Polyvinyl chloride resin | 100 |
| Anti-shock resin | 11 |
| Acrylic resin | 0.5 |
| Epoxide soy bean oil | 3 |
| Chelating agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.3 |
| Glyceryl trimontanate | 0.3 |
| Internal lubricating agent | 1 |

The definition of Chelating Agent 1832 is as follows:
Diphenyldecyl phosphite: 67 parts by weight Solution of 10% zinc octoate in diisobutyl phthalate: 33 parts by weight.

1. Gelation

This study was performed on a plastograph, working at a temperature of 150° C., turning at a speed of 30 r.p.m. and containing a charge of 25 g of powder under constant pressure.

The following results were obtained:

| Lubricating agent | Start of gelation in sec. | End of gelation in sec. |
|---|---|---|
| glyceryl trihydroxy-stearate | 75 | 210 |
| thiodiglycol dibehenate | 110 | 260 |

Glyceryl trihydroxystearate has a shorter gelation time than that of the compound of the invention.

The behenate according to the invention has thus been found to retard the commencement and the end of gelation, which is a desirable quality as far as internal lubrication is concerned. The increase of gelation time is particularly valuable when degassing of the resin is necessary.

2. Dynamic thermostability of the resin

In this test the compound of the invention was again compared to glyceryl trihydroxystearate. This study was also performed on a plastograph, but working at a temperature of 210° C., turning at a speed of 60 r.p.m. and containing a charge of 30 g of gelled material.

Two curves were drawn for each lubricating agent, namely:

a decomposition curve giving the value of the minimal resistant torque (m.kg) and the time of decomposition;

a curve giving the self-heating time in relation to temperature.

The self-heating time is defined by the moment when the temperature of the material exceeds the temperature of the plastograph (210° C.).

The results given in the following Table were obtained from these curves:

| Measurements | Glyceryl trihydroxystearate | Thiodiglycol dibehenate |
|---|---|---|
| Minimal resistant torque in m.kg | 1.075 | 1.070 |
| Decomposition time in min. | 32 | 34 |
| Self-heating time in min. | 14 | 14.5 |

In this test thiodiglycol dibehenate was found to be superior to glyceryl trihydroxystearate on all counts.

3. Sticking of the lubricated resin

This study was performed by placing the resin in a mixer of which the cylinders were heated to 210° C. and the material was submitted to alternate periods of 3 minutes of mixing and 3 minutes of rest, the space between the cylinders being 0.25 mm.

The following results were obtained:

| Measurement | Glyceryl trihydroxystearate | Thiodiglycol dibehenate |
|---|---|---|
| Resistance time to sticking in min. | 19 | 21 |

From the above results, it may be concluded that the compound of the invention is superior to glyceryl trihydroxystearate with regard to sticking.

4. Conclusion

As far as the internal lubricating effect is concerned, the polyalcohol behenate of the invention was found to be superior to glyceryl trihydroxystearate, which is considered to be the best lubricating agent known up to present.

C. External lubricating power

The compound of the invention was compared to glyceryl trimontanate, which is considered at present as the best external lubricating agent which does not provoke opacity.

This study was performed with the following formula of resin, glyceryl trihydroxystearate being used as internal lubricating agent:

| Ingredients | Parts by weight |
|---|---|
| Polyvinyl chloride resin | 100 |
| Anti-shock resin | 11 |
| Acrylic resin | 0.5 |
| Epoxide soja bean oil | 3 |
| Chelating agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.3 |
| Glyceryl trihydroxystearate | 1 |
| External lubricating agent | 0.3 |

1. Gelation

This study was performed on a plastograph, working at a temperature of 150° C., turning at a speed of 30 r.p.m. and containing a charge of 25 g of powder under constant pressure.

The following results were obtained:

| Lubricating agent | Start of gelation in sec. | End of gelation in sec. |
|---|---|---|
| Glyceryl trimontanate | 75 | 210 |
| Thiodiglycol dibehenate | 40 | 180 |

As far as gelation is concerned, the compound of the invention, although not superior to glyceryl trimontanate, nevertheless presents very useful properties.

2. Static thermostability of the lubricated resin

This study was performed by using the method which is described in French Pat. No. 2,273,841, the temperature of the oven being maintained at 185° C.

It was found that thiodiglycol dibehenate markedly improved the thermostability of the resins which were maintained in the oven for 50 minutes at 185° C.

3. Dynamic thermostability of the lubricated resin

This study was performed on a plastograph, working at 190° C., turning at a speed of 60 r.p.m. and containing a charge of 30 g of gelled material.

Two curves were drawn for each lubricating agent, namely:

a decomposition curve giving the value of the minimal resistant torque (m.kg) and the time of decomposition;

a curve giving the self-heating time in relation to temperature.

The results given in the following Table were obtained from these curves:

| Measurements | Glyceryl trimontanate | Thiodiglycol dibehenate |
|---|---|---|
| Minimal resistant torque in m.kg | 1.075 | 1.020 |
| Decomposition time in min. | 32 | 33.5 |
| Self-heating time in min. | 14 | 14.75 |

These results show that the compound of the invention is superior to glyceryl trimontanate since it has:

a weaker minimal resistant torque a greater decomposition time a greater self-heating time.

4. Sticking of the lubricated resin

This study was performed by placing the resin in a mixer of which the cylinders were heated to 210° C. and the material was submitted to alternate periods of 3 minutes of mixing and 3 minutes of rest, the space between the cylinders being 0.25 mm.

The following results were obtained:

| Measurement | Glyceryl trimontanate | Thiodiglycol dibehenate |
|---|---|---|
| Resistance time to sticking in min. | 19 | 20 |

The results show that the compound of the invention is slightly superior to glyceryl trimontanate and constitutes a valuable lubricating agent with regard to resistance to sticking.

5. Conclusion

As far as external lubrication is concerned, the most significant property is the resistance time to sticking.

In this respect, as stated above, the compound of the invention has been found to be slightly superior to glyceryl trimontanate. However, thiodiglycol dibehenate markedly improves the resistance of the resin to thermal decomposition, owing to lower internal friction due to lower viscosity, as is proved by the results obtained with the plastograph.

This latter finding furthermore confirms the excellent internal lubricating properties of the compound of the invention.

The following Example provides a non-limitative illustration of the process of preparation of the compound covered by the invention:

EXAMPLE

Into a 1250 ml-flask equipped with a central stirrer, a dropping-funnel, a source of nitrogen, a thermometer, a Dean-Stark separator and a vertical condenser, were introduced 224.5 g (0.66 mol) a behenic acid and the medium was progressively heated until the behenic acid was completely melted (about 70° C.), after which 44.25 g (0.28 mol) of thiodiglycol and 0.50 g of a 50% aqueous solution of sodium hydroxide were added while stirring. The reaction medium was heated, under nitrogen atmosphere, to 195° C. over a period of 3 hours, then to 225° C. over a period of 2 hours and this latter temperature was maintained for about 4 hours, until an acid number inferior or equal to 12 was obtained.

The mixture was cooled to 90°-95° C. and the molten material was poured onto a stainless steel plate. After cooling, 246 g of thiodiglycol dibehenate were obtained.

M.P.: 73° C.—Yield: 97%.

We claim:

1. A method of use of thiodiglycol dibehenate as lubricating agent for thermoplastic materials, which method consists in incorporating the said thiodiglycol dibehenate as internal lubricating agent in a formula of thermoplastic material containing a known external lubricating agent.

2. A method of use of thiodiglycol dibehenate as lubricating agent for thermoplastic material which method consists in incorporating the said thiodiglycol dibehenate as external lubricating agent in a formula of thermoplastic material containing a known internal lubricating agent.